United States Patent Office 3,375,211
Patented Mar. 26, 1968

3,375,211
ULTRAMICROCELLULAR POLYMERIC STRUCTURES CONTAINING AN INFLATANT
Robert Guy Parrish, Sharpley, Del., assignor to E. I. du Pont de Nemours and Company, Wilmington, Del., a corporation of Delaware
No Drawing. Continuation-in-part of application Ser. No. 302,720, Aug. 16, 1963. This application Feb. 14, 1967, Ser. No. 615,883
21 Claims. (Cl. 260—2.5)

ABSTRACT OF THE DISCLOSURE

An ultramicrocellular structure, the cells of which contain an inflatant whose permeability coefficient for diffusion through the cell walls is less than that of air, can be obtained by flash-extruding a solution of a polymer in an activating liquid, which solution also contains the inflatant. Upon extrusion, the cells of the structure are partially collapsed but unruptured. Upon exposure to air the structure self-inflates due to diffusion of air into the cells.

CROSS REFERENCES TO RELATED APPLICATIONS

This application is a continuation-in-part of my copending application Ser. No. 302,720, filed Aug. 16, 1963, now abandoned.

BACKGROUND OF THE INVENTION

This invention relates to a novel class of ultramicrocellular structures containing a particular volatile constituent within the cells. It also relates to such structures which are provided in a collapsed condition so as to be capable of self-inflation.

Crystalline polymeric ultramicrocellular structure and methods for their production are described in U.S. Patent 3,227,664, issued Jan. 4, 1966. The ultramicrocellular structures are particularly unique owing to the polyhedral shaped structure of their cells, to the film-like character of the cell walls, and to the uniform texture and high degree of molecular orientation, i.e. uniplanar orientation, existing in those walls. Together these features serve to define a class of materials which, in comparison with prior art cellular structures, exhibit outstanding strength and resiliency properties although fabricated at extremely low densities. From the standpoint of still other desirable characteristics, the ultramicrocellular structures are supple, opaque, pneumatic, and have an exceedingly high bulk and low thermal conductivity (or $k$ factor). Because of this superior combination of properties and the fact that they can be produced in sheet, filament or other shaped or bulk form, the ultramicrocellular structures are well adapted to a great variety of end uses.

SUMMARY OF THE INVENTION

An object of the invention is to obtain an improved class of ultramicrocellular structures by the provision of a particular volatile constituent within the cells. A further object of the invention involves the attainment of ultramicrocellular structures in a form such that substantial reductions in density can be realized. A further object of the invention relates to such structures which are provided in a substantially collapsed, relatively dense form such that they can be self-inflated to a low density pneumatic form at the point of use. It is a further object to provide a process for preparing and handling such self-inflatable structures. It is also an object to provide storage stable articles wherein the ultramicrocellular component can be self-inflated either spontaneously in air or by merely heating in air. It is a still further object to provide collapsed ultramicrocellular structures which can be self-inflated to a predetermined shape and size, or which can be self-inflated within a confining volume such that the structure expands to take on the shape of that volume. Other objects will be apparent from the remainder of the specification and claims.

In accordance with the invention, there is provided an ultramicrocellular structure composed of a high molecular weight synthetic crystalline polymer and having a major proportion of closed polyhedral cells defined by air permeable walls having a thickness of less than 2 microns with essentially all the polymer constituting cell walls and exhibiting uniform texture and uniplanar orientation, said cells containing an inflatant whose permeability coefficient for diffusion through said walls is less than that of air, said inflatant being capable of generating a vapor pressure of at least 30 mm. Hg at a temperature below the softening point of said polymer and being selected from the group consisting of sulfur hexafluoride and saturated aliphatic and cycloaliphatic compounds having at least one fluorine to carbon covalent bond and wherein the number of fluorine atoms exceeds the number of carbon atoms.

The foregoing structures containing the described inflatants may vary from extremely low density/high bulk materials of only 0.02 g./cc. or less, e.g. as obtained in the case where self-inflation is allowed to continue unimpeded following cell formation, to relatively high density materials, e.g. as obtained in the case where self-inflation of a collapsed cellular structure is restrained by preventing the osmotic diffusion of air into the cells after their formation. The latter class of high density materials is further characterized by the presence of partially collapsed but unruptured polyhedral cells and by an ability to be post-inflated to less than one-half its collapsed density without substantial stretching of the cell walls by having an $N_c \cdot s^{3/2}$ product greater than about 30, wherein $N_c$ is the number of cells per cc. in the collapsed structure and $s$ is the average cell surface area in square centimeters.

Also in accordance with this invention there is provided a process for obtaining the above-mentioned collapsed, self-inflatable ultramicrocellular structure. The process is an improvement on the flash extrusion process described in aforementioned U.S. Patent 3,227,664 wherein a solution of a polymer in an activating liquid, said solution being maintained at super-atmospheric pressure and at a temperature above the boiling point of said activating liquid, is discharged from an orifice into a region of lower pressure and temperature to precipitate said polymer. The improvement comprises providing in said solution an inflatant of the type hereinabove described. Immediately following extrusion, the structure collapses owing to condensation of the activating liquid and/or diffusion thereof through the cell walls. The inflatant, however, remains within the cells and provides an osmotic driving force for diffusion of air into the cells, and consequent inflation of the structure.

DETAILED DESCRIPTION

Among the numerous advantages afforded by the invention, it is first of all significant that the utilization of particular volatile inflatants within the cells serves to permit lower density values than would otherwise be achieved. Aside from the obvious economic benefits which are thereby realized in those applications in which bulk is of importance, improved functional properties, particularly with respect to insulation uses, are also achieved. In the case where the inflatant is selected to be of an impermeant character, i.e. so that there is little or no tendency for it to diffuse out of the cells, then a further advantage is obtained in that the products can be successively compressed and released under a load without a permanent loss in pneumaticity. Still a further and highly unexpected benefit arising from the use of the inflatants is that a simple and effective means is thus obtained for overcoming the costly and cumbersome problems heretofore associated with the handling, storage and transportation of ultramicrocellular structures. This benefit is achieved by initially obtaining the structures in a storage stable, self-inflatable, collapsed form rather than in the high-bulk form otherwise produced. When and where desired, the ultimate users of the product can then effect spontaneous inflation thereof to the desired degree, e.g. by simply opening an air impervious package containing the collapsed material. For some purposes, the collapsed self-inflatable structures possess still another important advantage; namely, that the structures can be expanded within a confining volume to fully occupy the space therein.

The ultramicrocellular structures of the invention are desirably produced by the extrusion of a solution containing a high molecular weight synthetic crystalline polymer, an inflatant as hereinbefore described, and an activating liquid for which the polymer is highly permeable. The solution, maintained at a temperature above the boiling point of the activating liquid and at a pressure substantially above atmospheric pressure, is extruded through an orifice into a region of lower pressure and temperature, normally room temperature at about one atmosphere. Immediately upon extrusion into the low pressure and temperature region, substantially all of the activating liquid evaporates adiabatically. As a result, a large number of tiny vapor bubbles, usually at least about $10^5$ bubble nuclei per cc., are created in the solution and sufficient heat is absorbed to lower the temperature of the confining polymer below the polymer melting point. This step occurs very rapidly, usually in less than $10^{-2}$ seconds, and therefore effectively freezes-in the molecular orientation generated in the polymer cell walls during the bubble expansion. With a short period of time, usually less than about 10 seconds or so, the structure will tend to partially collapse to a transient or unstable condition owing to condensation of the activating liquid and/or partial diffusion thereof through the cell walls. A substantial proportion or all of the slower diffusing inflatant remains as a confined residue within the cells. If a large amount of gaseous inflatant remains in the cells, then this will override the tendency of the cells to collapse and actual collapse will not occur. In either case continued exposure of the extrudate to the air atmosphere will give rise to a fully inflated product since the inflatant vapors create an osmotic driving force which facilitates entry of air molecules into the cells. When a fully inflated sample is so obtained directly following the extrusion operation, the product will exhibit a lower density than a corresponding structure prepared from a solution containing no such inflatant. Even in the fully expanded form the role of the inflatant is not complete so long as vapors thereof persist in the cells; that is, the structure will self-inflate in air even though it has been maintained under a compressive load to such an extent that a considerable quantity of air has escaped from the cells.

In a preferred embodiment of the invention, the choice and quantity of inflatant are such that upon condensation and/or diffusion of the activating liquid immediately following extrusion, the structure will actually collapse even though exposed to air. During the period when the density of the resultant collapsed structure is at least twice that desired in the product upon post-inflation, preferably while the density is at a maximum, self-inflation is restrained by preventing osmotic diffusion of air into the cells. Thus in one embodiment the transient collapsed condition can be preserved by enclosing the material in a gas impervious barrier, e.g. a plastic bag or other sealed container from which air is excluded. Depending upon the exact relative permeation rates of the activating liquid and air as well as the original quantity of each in the cells, the stage of maximum or near maximum collapse can persist for an appreciable period of time (e.g. a few minutes to an hour or so), and the imposed restraint may successfully be effected at any time within this period.

General process parameters for mixing and extrusion techniques are described in aforementioned U.S. Patent 3,227,664.

The manner by which the ultramicrocellular structures can self-inflate to a maximum in air, either during extrusion or at a later time, depends not only upon the particular configuration and construction of the cells but also upon the interaction of the confined inflatant and the synthetic polymer which forms the cell walls. Still an additional factor which contributes to the self-inflatable characteristic involves the permeant nature of air as a post-inflation atmosphere; more particularly, the ability of air to diffuse into the cells of the structure before the inflatant can diffuse outwardly therefrom. In this respect it is to be understood that the so-called "air permeability" property of the cell walls of the structures of the invention is attributed not to porosity in the sense of openings, but rather to the ability of the walls to selectively permit diffusion therethrough of certain vapors. In effect the walls are semi-permeable such that air will osmotically diffuse from a high air partial pressure side of a wall through the wall to a low air partial pressure side of that wall until the respective fugacities are equal. On the other hand, osmotic diffusion through the walls by a highly impermeant gas will be restrained irrespective of whether or not such a partial pressure differential exists.

With regard first to the unique ultramicrocellular structure of the products of the invention, substantially all of the polymer is present as filmy element whose thickness is less than 2 microns, preferably under 0.5 micron. The term "drained foam" is aptly descriptive of such ultramicrocellular structures. The thickness of a cell wall, bounded by intersections with other walls, does not ordinarily vary by more than ±30%. Adjacent walls frequently will have generally equal thickness values, such as within a factor of 3. The polymer in the cell walls exhibits uniform texture and uniplanar orientation. The apparent density of the ultramicrocellular products is between 0.5 and 0.005 g./cc. The number of cells per cc. in expanded condition, $N_i$, is desirably at least $10^3$, although values of $10^5$ or greater are preferred.

The cell wall thickness can be determined by microscopic examination of cross sections. With a deflated sample such measurements are facilitated by first inflating the sample as later described. Thus 20–60 micron thick sections may be cut from a frozen sample with a razor blade. Large cell (>50 microns) samples are frozen directly in liquid nitrogen. Smaller celled samples are preferably "imbedded" in water containing a detergent, and then frozen and sectioned. The transverse dimension of one or more cells can also be readily measured by freezing and sectioning techniques. The cells are found to exhibit a general polyhedral shape, similar to the shape of the internal bubbles in a foam of soap suds. In order for inflated ultramicrocellular products to be supple, opaque and strong, the cell dimensions must be small compared to the smallest external dimension of the product. For this reason the average transverse dimension of the cells in expanded condition should be less than 1000 microns, preferably less than 300 microns, and the mutually perpendicular transverse dimensions of a single cell in a fully inflated condition should not vary by more than a factor of three. The ratio of the inflated cell volume to the cube of the wall thickness can be calculated and exceeds about 200. For very thin walled samples (<1 micron), the wall thickness is preferably measured with an interferometer microscope. A layer of the sample is peeled off by contact with "Scotch tape." The layer is freed from the tape by immersion in chloroform and subsequently placed on the stage of the microscope for measurement.

The term "uniplanar orientation" employed with respect to the products of this invention may be fully understood from the following discussion. "Axial," "planar," and "uniplanar" indicate different types of molecular orientation of high polymeric materials. "Axial orientation" refers to the perfection with which the molecular chains in a sample are aligned with respect to a given direction, or axis, in the sample. For example, prior art filaments which have been drawn in one direction only generally exhibit an appreciable degree of axial orientation along the stretch direction. "Planar orientation" refers to the perfection with which the molecular chains are oriented parallel to a surface of the sample. "Uniplanar orientation" as possessed by the products of this invention, is a higher type of polymer orientation in that it refers to the perfection with which some specific crystalline plane (which must include the molecular chain) in each polymer crystallite is aligned parallel to the surface of the sample. Obviously, only crystalline polymers can exhibit uniplanar orientation. These three types of molecular orientation may occur singly or in combination; for example, a sample might simultaneously exhibit uniplanar and axial orientation.

Electron diffraction furnishes a convenient technique for observing the presence of uniplanar orientation in the microcellular structures of this invention. A single cell wall is placed perpendicular to the electron beam. Since the Bragg angle for electron diffraction is so small, only crystalline planes essentially parallel to the beam (perpendicular to the wall surface) will exhibit diffraction. If the sample does in fact have perfect uniplanar orientation, there is some crystallographic plane which occurs only parallel to the film surface and, therefore, will be unable to contribute to the diffraction pattern. Thus, the observed pattern will lack at least one of the equatorial diffractions normally observed for an axially oriented sample of the same polymer. If the degree of uniplanar orientation is somewhat less than perfect, there may be a few crystallites tilted far enough to contribute some intensity to the diffraction pattern, but at least one of the equatorial diffraction intensities will be appreciably less than normal. Thus, for the purpose of this invention, a sample is considered to have uniplanar orientation when at least one of the equatorial diffractions appears with less than one-half its normal relative intensity as determined on a standard which is a randomly oriented sample of the same polymer. A simple standard for this purpose is a thick inflated portion of the same ultramicrocellular structure, since the total array of many walls averages out to random orientation; necessarily the intensities of the diffraction pattern for such a standard will be made using an X-ray beam because of the increased sample thickness.

An alternative and occasionally more convenient technique for detecting the presence of uniplanar orientation in a sample is to observe the electron diffraction pattern as the plane of the sample is tilted with respect to the electron beam. (In case the sample also exhibits axial orientation, the tilt axis is preferably parallel to the orientation axis.) For uniplanar-oriented samples, first one crystallographic diffraction plane and then another will assume the position required for Bragg diffraction, so that first one and then another lateral diffraction will appear and then disappear as the sample rotation continues. The more perfect the degree of uniplanar orientation, the more sharply defined is the angle at which any particular diffraction appears. When a plot of diffraction intensity (corrected for sample thickness variation) vs. angle of sample tilt is prepared for any of the lateral diffractions, the distance in "degrees tilt" between points of half-maximum intensity may be readily determined. Only samples having uniplanar orientation will have half-maximum intensity points separated by 90° or less, and this will serve as an alternate criterion for the presence of uniplanar orientation.

One precaution must be observed in making this measurement. If the sample field examined by the electron beam is stopped down so far that it "sees" only one crystallite at a time, it will always be possible, even for a randomly oriented sample, to find some crystallite oriented parallel to the sample surface which would, of course, give an "uniplanar orientation" diffraction pattern. In order to insure that the "uniplanar orientation" pertains to the whole film element and not just to one crystallite, the measurement should be made examining a field of at least 100 square microns area, which is large enough to include the contributions from many crystallites simultaneously. Other techniques of measuring uniplanar orientation and their co-relation with electron diffraction measurements are described in the J. Pol. Sci., 31, 335 (1958), in an article by R. S. Stein.

The term "uniform texture" applied to the polymer in the cell walls means that the orientation, density, and thickness of the polymer is substantially uniform over the whole area of a cell wall, examined with a resolution of approximately ½ micron. This is best determined by observing the optical birefringence in the plane of a wall of a cell removed from the sample. For ultramicrocellular samples with a net over-all axial orientation, the individual cell walls will also normally exhibit an axial orientation in addition to the required uniplanar orientation. In the birefringence test, such products of the present invention will show a uniform extinction over the whole area of the cell wall. Samples with no net axial orientation must show a uniform lack of birefringence over their whole area rather than numerous small patches of orientation with each patch oriented at random with respect to the others. Lacy or cobweb-like cell walls, of course, do not have uniform birefringence over the whole area of a cell wall, and such products are readily distinguished from the uniform textured products of this invention.

It is characteristic of and essential to the products of this invention that the cells be of the closed variety and be unruptured even in a collapsed condition. By closed is meant that at least a major proportion by number of cells in any ultramicrocellular sample possess a plurality of defining walls, i.e. unruptured walls, which wholly encapsulate an inner space or void. For practical purposes mere visual or microscopic examination will often readily reveal whether or not a particular cellular structure predominates in closed or open cells. Particularly this is true in the case when the identity of the polymer and the conditions of cell formation are known. Otherwise the closed-cell content of a yieldable sample may be determined by the gas displacement method of Remington and Pariser, "Rubber World," May 1958, p. 261, modified by operating at as low a pressure differential as possible to minimize volume changes of the yieldable closed cells. Those structures which are in a collapsed condition are recognizable as such because of their ability to be post-inflated when osmotic diffusion of air thereinto is no longer restrained. Even repeated steps of inflation and deflation performed upon a given sample fail to destroy or rupture a significant number of cell walls.

The collapsed ultramicrocellular structures of the invention are self-inflatable to less than one-half their collapsed density by having an $N_c \cdot s^{3/2}$ product greater than 30, wherein $N_c$ and $s$ are as hereinbefore defined. Fulfillment of this limitation in effect ensures that the cells are in a sufficiently collapsed condition to be post-expandable to at least twice their collapsed volume without substantial stretching of the cell walls.

It should be noted that the expression $N_c \cdot s^{3/2} > 30$ is essentially independent of cell geometry so long as the cells are polyhedral and have film-like walls of the maximum thickness values specified herein. In practice the values of $N_c$ and $s$ need not be determined directly for cellular samples but rather can be calculated from other known or determinable factors, e.g.:

$$s = \frac{\rho_m}{\rho_o} \cdot \frac{2}{tN_m}$$

and $$N_c = N_i \cdot \frac{\rho_c}{\rho_i} = N_m \cdot \frac{\rho_c}{\rho_m}$$

wherein:

$s$ is the average cell surface area in cm.$^2$,
$\rho_m$ is the average density of the foam sample at any convenient degree of inflation, $m$,
$\rho_o$ is the bulk polymer density,
$t$ is the average cell wall thickness in cm.,
$N_m$ is the number of cells per cc. in the sample at the same degree of inflation, $m$,
$N_c$ is the number of cells per cc. in the sample in a collapsed condition,
$N_i$ is the number of cells per cc. in the sample in inflated condition,
$\rho_c$ is the density of the sample in collapsed condition, and
$\rho_i$ is the density of the sample in inflated condition.

When these definitions are inserted in the previous inequality relation characterizing collapsed cellular structures, simple algebraic manipulation yields:

$$\frac{\rho_c^2}{\rho_o^3 t^3} \cdot \frac{\rho_m}{N_m} > 112$$

This provides an entirely equivalent definition of collapsed cellular structures in which only directly observable parameters appear, and which therefore is ordinarily more convenient to employ.

Values of $\rho$ for a sample of an ultramicrocellular structure at any degree of inflation are conveniently obtained by measuring the volume of water that a given weight of sample displaces. Values of $N_m$ can be determined by microscopic examination. The latter measurement will ordinarily be easiest to perform when the sample is in a fully inflated condition. Alternatively, a sufficiently accurate approximation for an inflated sample is $$N_m = N_i \cong \frac{1}{d^3}$$

where $d$ is the average cell diameter. The value obtained can then be used to calculate $N_c$ from the equation $N_c = N_m(\rho_c/\rho_m)$.

From simple geometrical arguments, it can be shown that the quantity $N_i \cdot s^{3/2}$ is quite insensitive to cell geometry, and ranges only from 13.7 to 15.8 for fully inflated closed cell structures with assumed shapes ranging from square to hexagonal cross sections and ratios of length to width up to 2:1. Even a grossly disproportionate cell elongation ratio of 5:1 would only provide an $N_i \cdot s^{3/2}$ quantity of 20.7. Therefore the restriction that $N_c \cdot s^{3/2} > 30$ requires that the cell walls have been crumpled and the structures collapsed so that the number of cells per cc. is at least twice that of the fully inflated structures, i.e. the product can be reinflated to at least twice its collapsed volume without generating any new cells or appreciably stretching any of the pre-formed crumpled walls existing in the partially collapsed structures. The preferred collapsed products will have $N_c \cdot s^{3/2}$ values greater than 60, i.e. can be post-reinflated to at least 4 times their collapsed volume.

The polymers employed in accordance with the invention are members of the class of high molecular weight synthetic crystalline polymers. Since the polymer walls of the ultramicrocellular structures are film-like with a thickness of less than 2 microns, the polymer must accordingly be of at least film-forming molecular weight.

A further requirement of the polymer relates to the strength and resiliency which cell walls thereof impart to the ultramicrocellular structure. Thus the polymer must impart sufficient strength to the structure that the particular cellular nature thereof not be destroyed upon inflation, e.g. so as to resist rupture or a significant stretching of the cell walls. For this reason the polymer should have a yield strength of at least 1000 p.s.i. as measured by the test method of ASTM D638–58. On the other hand, for inflation to occur such that maximum bulk values are obtained, the polymer composed structure must be such that in expanded condition it be "yieldable," e.g. resilient such that substantial deformation occurs under internal-external pressure differentials, meaning differences, of one atmosphere or less (since this is the order of magnitude of the pressure differentials available for collapse and inflation). By substantial deformation is meant that the ultramicrocellular structure in expanded condition, i.e. having an internal pressure of at least about one atmosphere with few if any buckles and wrinkles in the cell walls, is yieldable such that its volume can be compressed by at least 10% under a load of 10 pounds per square inch sustained for a period of 1 second with recovery of at least about 50% of its orginal volume on release of the load. Structures which do not compress to that extent are entirely too rigid and hence do not afford a sufficient degree of resiliency to respond to pressure differentials. Moreover, if it does not sufficiently recover after release of the load, then it is not sufficiently flexible to resist fracturing and rupturing of the cell walls.

An essential feature of the polymer which constitutes the cell walls is that it exhibits selective permeability to different gases; in particular, be permeable with respect to air but less permeable with respect to inflatant vapors. Without this feature efforts to achieve full expansion would be unsuccessful for the reason the inflatant would be prematurely lost before sufficient air had entered the cells. The class of crystalline and crystallizable polymers is well suited for achieving this function.

Examples of synthetic organic polymers suitable for producing ultramicrocellular structures in accordance with this invention thus include the class of synthetic crystallizable, organic polymers; e.g. polyhydrocarbons such as linear polyethylene, stereo-regular polypropylene or polystyrene; polyethers such as polyformaldehyde; vinyl polymers such as polyvinylidene fluoride; polyamides both aliphatic and aromatic, such as polyhexamethylene adipamide and the polyamide from 2,2-bis p-aminophenyl propane and isophthalic acid; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and equivalents. The polymers should have a softening point of at least about 40° C., as indicated by passing a stick of solid polymer in sliding contact with a heated metal bar and observing the bar temperature at which a streak of molten polymer is first formed. Polymer properties such as solubility, melting point, etc. are usually reflected in the properties of the ultramicrocellular product.

One of the features of the ultramicrocellular structures is the high degree of orientation of the polymer in the cell walls, which contributes to the unique strength of these structures. Therefore, a preferred class of polymers includes those materials which respond to an orienting operation (e.g., drawing of fibers or films) by becoming substantially tougher and stronger. This class of polymers is well known to one skilled in the art and includes, for example, linear polyethylene, polypropylene, 66 nylon, and polyethylene terephthalate.

As is clear from the foregoing disclosure, the polymers suitable for use in preparing the cellular structures of this invention must have a reasonable permeability to air at room temperature, e.g. have a diffusion coefficient for nitrogen of at least $10^{-13}$ cc.*/cm.²/sec./cm.*/cm. Hg.****

The function of the inflatant contained within the cells of the products of the invention is to afford an osmotic driving force which is capable of causing inflation of the structure, e.g. during the extrusion operation or at a later time. Accordingly such inflatant must be "relatively impermeant" by which is meant that at 25° C. its permeability coefficient for diffusion through the cell walls be lower than that of air. Thus the vapors of the inflatant must be incapable of permeating the cell walls, e.g. outwardly from the sample, as fast as air can permeate the cell walls, e.g. into the sample, for otherwise full inflation of the cells could not be achieved upon continued exposure of the sample to an air atmosphere. An impermeant inflatant is one whose permeability coefficient for diffusion through the cell walls is not only lower than that of air but also is incapable of permeating the same cell walls at room temperature, e.g. below 40° C., at such a rate that ½ or more thereof will escape to an air atmosphere by diffusion within 1 day's time, preferably 1 month's time or longer. The latter guarantees in effect that the structure, whether collapsed or not, will retain its inflation activator (the impermeant inflatant) for a reasonable storage period. Considerable economic benefits accrue from being able to work with collapsed, post inflatable filaments or sheets in a primary production area, particularly with regard to rewinding and web slitting operations. For such purposes an impermeant inflatant "lifetime" of 1 day is ample. However for inventory, storage purposes and shipping operations, longer lifetimes are usually required, e.g. of one month or longer.

If the inflatant has essentially zero permeability through the cell walls at room temperature and atmospheric pressure, as is preferred, a further advantage is gained; namely, the sample can be successively inflated and deflated as desired either by mere application and release of a load or, alternatively, by the respective steps of simply exposing to air and removing from contact with air. Necessarily the inflatant must not be a solvent for the polymer under such conditions that the sample will be exposed to following discharge from the extrusion orifice.

The minimum quantity of inflatant contained in each cell is of significance in realizing an adequate osmotic driving force to obtain reliable and reasonably rapid self-inflation to the fullest extent. Thus a major number of the cells should contain at least some quantity of the inflatant. Since the inflatant must exist in a gaseous condition to create an osmotic driving force, it must be either a gas at room temperature or be capable of vaporizing at a temperature below the melting point of the synthetic polymer defining the walls. In practice it has been found that the inflatant must be capable of generating a vapor pressure of at least 30 mm. Hg at a temperature below the softening point of the polymer in order to reliably provide well defined cavities into which the external air will diffuse in reasonable periods of time. Therefore, if the vapor pressure of the inflatant in the partially collapsed cells is at least 30 mm. at room temperature, as is preferred, the structure will normally self-inflate in air as desired. However, inflatants whose vapor pressures are less than 30 mm. at room temperature may also be successfully employed although frequently an added step of briefly heating the structure, above room temperature but below the polymer softening point, to increase the partial pressure of the inflatant will assist in reducing the time necessary for full inflation to occur.

Higher internal inflatant pressures are of course operable, and are in fact preferred, particularly when the confining cellular structure has walls near the upper thickness limit (2 microns) or when the polymer comprising the walls possesses a high flexural modulus (above 100,000 p.s.i.) at room temperature. In general, the solution of polymer to be extruded should contain about 1 to 20% by weight of the inflatant.

The rate of permeation for an inflatant through a given polymer increases as its diffusivity and solubility increase. Accordingly, candidates for inflatants should have as large a molecular size as is consistent with the required 30 mm. minimum vapor pressure, and have little solvent power or affinity for the confining polymer cell walls. A preferred class of such inflatants is exemplified by compounds whose molecules have chemical bonds different from those found in the confining polymer, a low dipole moment, and a very small atomic polarizability. Furthermore, it is advantageous, though not necessary, that the inflatant be a high vapor pressure solid or liquid under ambient conditions in order that small quantities of solid or liquid phase inflatant may be present in each partially collapsed cell, in addition to the inflatant vapor. For such systems the inflatant vapor is replenished from the solid or liquid inflatant "reservoir" as the collapsed structure inflates, thus maintaining the full osmotic driving force up through the stage of full inflation. Materials which are non-gaseous at room temperature and atmospheric pressure are preferred since for a given weight they occupy less volume; hence, the bulk of collapsed structures can be appropriately minimized. Products containing the normally liquid or solid inflatants need at most only be heated in the atmosphere to vaporize a part of the inflatant and to thereby spontaneously cause inflation.

Suitable inflatants according to the invention are selected from the group consisting of sulfur hexafluoride and saturated aliphatic and cycloaliphatic compounds having at least one fluorine to carbon covalent bond and wherein the number of fluorine atoms exceeds the number of carbon atoms. Preferably the saturated aliphatic and cycloaliphatic compounds are, respectively, perhaloalkanes and perhalocycloalkanes in which at least 50% of the halogens are fluorine. Although the aliphatic and cycloaliphatic inflatants may contain ether-oxygen linkages, they are preferably free of nitrogen atoms, carbon to carbon double bonds and reactive functional groups. Specific examples of inflatants include sulfur hexafluoride, chlorotrifluoromethane, dichlorodifluoromethane,

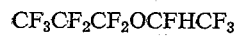

1,1,2-trichloro - 1,2,2 - trifluoroethane, sym-dichlorotetrafluoroethane, perfluorocyclobutane, perfluoro-1,3-dimethylcyclobutane, and perfluorodimethylcyclobutane isomeric mixtures. Mixtures of two or more inflatants can often be used to advantage.

Aside from the foregoing characteristics, it will be understood that the inflatants must be inert, i.e., be thermally stable under extrusion conditions, and chemically and hydrolytically stable under ambient conditions. For certain uses it will be recognized that toxic compounds should be avoided.

Since an essential function of the activating liquid is to generate the cells upon adiabatic evaporation thereof, it must fulfill the following criteria:

(a) The liquid should have a boiling point of at least 25° C. and preferably at least 60° C. below the melting point of the polymer used;

(b) The liquid should be substantially unreactive with the polymer and inflatant during mixing and extrusion;

(c) The liquid should be a solvent for the polymer under the conditions of temperature, concentration and pressure suitable in this invention;

(d) The liquid should form a solution which will undergo rapid vaporization upon extrusion. Activating liquids which have been found suitable for certain polymers in the process of this invention include methylene chloride, fluorotrichloromethane, 2,2-dimethyl butane, pentane, hexane, and methanol.

*Cc. of gas at STP.
**Cm.³ of surface.
***Cm. of sample thickness.
****Pressure difference across sample.

The production of collapsed self-inflatable ultra-microcellular structures requires a judicious selection of inflatant and activating liquid to ensure that a transient collapsed structure is obtained. To this end it is desirable to select an activating liquid which will quickly permeate the cell walls before being fully replaced by air from the atmosphere. For this technique the activating liquid should be one whose vapors have a permeability at least twice that of air through the selected polymer in its nascent condition upon emerging from the extrusion orifice. Alternatively, the structure may be extruded into an atmosphere of a relatively impermeant gas to facilitate outward diffusion of the activating liquid and prevent inward diffusion of air or other gases. In the event a gaseous or liquid nucleation assistant such as carbon dioxide or nitrogen is employed to give increased nucleation, it too must be highly permeant or otherwise incapable of preventing collapse of the extrudate. Certain non-fluid nucleation assistants such as the silicates which remain as solid particles in the product do not, of course, impair spontaneous deflation.

For purposes of obtaining the ultramicrocellular structures in a collapsed condition, an essential feature leading thereto comprises catching the cellular structures in transient, collapsed, inflatant-containing condition and immediately preventing diffusion of air into the cells. The transient collapsed state required for the process is preferably produced by exposing to air (or an atmosphere of an even less permeant gas) a freshly extruded, unstable, inflated cellular structure whose cells contain, in addition to the required impermeant inflatant, at least ½ atmosphere partial pressure of an activating liquid which permeates the polymer at a rate at least twice as fast as air permeates the polymer. Upon such exposure the rapid permeating agent escapes from the cells at a rate faster than air permeates in to take its place, thus decreasing the internal gas pressure to the point where external atmospheric pressure crushes and collapses the cellular structure. At room temperature this collapsed condition is transient for the reason that air continues to diffuse into the partly collapsed cells to reinflate them, driven by the osmotic pressure gradient created by the continued presence in the cells of the impermeant inflatant. It is one discovery of this invention that this transient collapsed state may be "trapped" and confined indefinitely by any of a variety of means serving to prevent osmotic diffusion of air into the cells.

A particularly suitable technique for restraining self-inflation of the transient collapsed ultramicrocellular structures involves the utilization of gas impervious barrier means to surround the structure. Such means can vary widely depending upon such factors as availability, convenience in handling, and the like. Preferably they are in the nature of flexible containers or receptacles adapted to receive the collapsed structure shortly after extrusion and to be sealed from contact with the air. Although plastic film materials such as bags, pouches or other wrapping forms are especially suitable, aluminum or other metal foils, resin impregnated fibrous webs and the like can also be employed in the form of suitable containers. Films of polyethylene terephthalate and polyolefin films coated with polyvinylidene chloride resins constitute a highly effective packaging medium. Except in the case where the particular contents are to be provided with a tightly fitting "skin" in which there is little or no available space for air or other gases, it is desirable to provide in the container an enveloping atmosphere of a gas which is impermeant to the cell walls of the ultramicrocellular structure. Thus by enclosing such a structure in a container which has first been flushed with an impermeant gas, there is no available air to diffuse into the cells and hence any tendency toward post-expansion is restrained. The considerations involved in the selection of such an impermeant gas are essentially the same as hereinbefore described with respect to the inflatants. For most purposes it will be desirable to use the identical gas to function both as an inflatant in producing the ultramicrocellular structure and as an external atmosphere in packaging the structure in a container.

It will be apparent that a flexible packaging material such as a plastic film is especially advantageous, since introduction of the impermeant gas is facilitated and since overall packaging efficiency can be optimized. Two features should be observed in the selection of a suitable packaging container. First of all it should be "gas impervious" in the sense that it prevents the entry thereinto of permeant gases such as air which would diffuse into the cells of the confined ultramicrocellular structure and cause inflation. In this regard the permeability coefficient of the container with respect to air should be essentially zero. On the other hand, no problem would be created should it be readily permeated by any residual activating liquid that may diffuse from the contents. In the case where the relatively impermeant inflatant employed to produce the ultramicrocellular structure would slightly permeate the cell walls on long standing, the barrier means or container should serve a second function; namely, that it retain within the article sufficient inflatant to cause self-inflation when the container is opened. Thus even though a portion of the inflatant is initially lost by diffusion from cells of the ultramicrocellular structure, continued losses will cease when the partial internal pressure of inflatant in the cells equals the partial pressure thereof outside of the structure and within the container.

For most purposes the packaging of a collapsed ultramicrocellular structure, for example following extrusion thereof, will be performed at room temperature and atmospheric pressure. It will be apparent to those skilled in the art that packaging and storage operations can, however, also be performed under conditions of elevated or reduced temperatures and/or pressures provided that the nature of the selected container is appropriate.

Particularly in the case where the inflatant is impermeant as above described, an alternative technique involving the use of mechanical restraining forces may be employed for preventing the self-inflation of a transient collapsed ultramicrocellular structure. So long as the external mechanical restraint or confinement is applied, it serves to counterbalance the osmotic self-reinflation driving force. When the collapsed structure is eventually released, osmotic self-reinflation to a stable, fully inflated cellular structure will occur as long as a sufficient quantity of inflatant remains in each cell. The mechanical restraint can be accomplished in any convenient fashion, as by stuffing the transient collapsed product into a bag or metal cage, or by common bailing methods employing confining straps. Also found satisfactory, is simply storing the collapsed cellular structure under dead load. Alternatively and in a preferred embodiment, the structure can conveniently furnish its own restraint, as when multiple layers of a collapsed sheet or fiber are wound on a core under tension. In any case, so long as each of the collapsed cells retains its quantity of the inflatant, self-reinflation occurs only when the mechanical restrain is removed.

A third means of effectively preventing a collapsed ultramicrocellular structure from self-inflating involves the use of certain crystalline synthetic polymers to impart sufficient rigidity to the cell walls. Thus when the polymer employed has a glass transition temperature of at least 40° C., as in the case with polyethylene terephthalate, and a structure is spun which spontaneously collapses, then a metastable product can be obtained which has no tendency to expand in the atmosphere as long as the material is maintained below its Tg°. In practice the metastable condition can be utilized by confining the freshly spun collapsed structure under a load for a period of time until the activating liquid has fully diffused therefrom and until the polymer in the cell walls has become "set." In such a structure, the osmotic self-reinflation driving force is counterbalanced by the mechanical rigidity of the crumpled cell walls as long as the material is maintained below its $Tg°$. The origin of the mechanical restraint resides in the high modulus of the crumpled walls with perhaps some contribution from light surface-bonding between internal crumpled cell faces. In any event, the osmotic inflation force prevails over the mechanical restraint when the glass transition temperature of the sample is exceeded, and the sample reinflates to become stable in fully inflated form.

As regards the provision of collapsed self-inflatable materials, the invention makes possible the economical production of ultramicrocellular structures at one central location while still taking advantage of storing and shipping the products in a substantially lower bulk form. Other advantages which also accrue from this technique include, for example, the fact that the collapsed structures will exhibit a volume expansion of at least 2 times upon, at most, mere exposure to air at an elevated temperature. Therefore, the collapsed structures can be placed inside a confining shape such as an airplane wing, refrigerator door, life jacket cover, etc., before exposing the sample to air, whereupon the expansion will completely fill (and reinforce, if adhesives or thermal bonding is employed) the confining structures. A further advantage lies in the fact that the structures can be pre-shaped, for example by the extrusion process itself, before they are collapsed so that the identical shape is regenerated on subsequent self-expansion. The ultramicrocellular structures can be extruded in the form of sheet materials, filamentary materials, rods, tubes, etc.

Among the numerous modifications which are possible, it will be apparent that the products of the invention can be provided to contain common polymer additives such as dyes, pigments, antioxidants, delusterants, antistatic agents, reinforcing particles, adhesion promoters, removable particles, ion exchange materials, U.V. stabilizers and the like by inclusion of such with the polymer solution prior to extrusion or by other suitable treatments.

The following examples serve to further illustrate this invention. Examples I to VIII demonstrate the preferred embodiment wherein the inflatant is provided in the cells directly by the extrusion procedure. An alternative technique involving introduction of inflatant into the cells of an already formed ultramicrocellular structure is illustrated in the remaining examples.

All parts given in the examples are by weight unless otherwise specified.

*Example I*

A mixture of 400 parts of polyethylene terephthalate (relative viscosity 45, dried 24 hours under vacuum at 80° C.), 325 parts methylene chloride, and 70 parts dichlorodifluoromethane inflatant is sealed into a 1 liter pressure vessel which is rotated end-over-end to mix the contents while being heated to 210° C. for 10 minutes, and then for a period of 15 minutes at 191° C. At this point rotation is stopped, the pressure vessel connected to a source of nitrogen at 800 p.s.i.g., and the solution extruded through a cylindrical orifice 15 mils diameter by 30 mils long. Flash evaporation of the solvent generates a fully inflated ultramicrocellular filament as soon as the super-heated polymer solution reaches the atmospheric pressure region.

A portion of the product (portion A) is piddled in a pile and allowed to stand in air at room temperature. A second portion (B) is collected in an air impermeable plastic bag filled with a dichlorodifluoromethane atmosphere. Both portion A and portion B collapse initially as methylene chloride (the predominant gaseous component) diffuses rapidly out of the cells, leaving behind only the slower diffusing dichlorodifluoromethane. Portion A subsequently self-reinflates as air permeates into the cells. Portion B, however, remains in a partly collapsed condition, since there is no osmotic driving force for the external dichlorodifloromethane to diffuse into cells already containing an atmosphere of dichlorodifluoromethane. After three days' storage in collapsed form, portion B is removed from the bag and its density determined to be 0.068 g./cc. compared to 0.022 g./cc. for self-reinflated portion A. After one additional day, standing exposed to air, portion B also self-reinflates to a density of 0.022 g./cc. The average cell diameter of the fully inflated yarn is 23 microns, and the wall thickness is 0.12 micron. The $N_c \cdot s^{3/2}$ value for the collapsed portion B is about 45. The cell walls of both samples are found to exhibit uniform texture and uniplanar orientation.

*Example II*

In three companion experiments, 40% solutions of polypropylene in fluorotrichloromethane are prepared in a pressure vessel at 145±1° C. The solutions are pressurized with nitrogen gas to 570 p.s.i.g. just prior to extrusion through a 50 mil diameter by 50 mil long cylindrical orifice. Since fluorotrichloromethane permeates polypropylene cell walls only slightly faster than air, the cells of the product from spin A containing no impermeant inflatant additive fill with air about as fast as the fluorotrichloromethane activating liquid escapes. The product therefore is not fully expanded, i.e. has a density of about 0.017 g./cc. In spins B and C 10% of the fluorotrichloromethane in the pressure vessel solution is replaced with impermeant inflatant, a mixture of isomers of perfluorodimethylcyclobutane in spin B and $CF_3CF_2CF_2OCFHCF_3$ in spin C. The respective ultramicrocellular products of spins B and C thus become fully inflated to densities of 0.010 and 0.012 g./cc. within 3–4 minutes of being extruded. The density of sample B remains substantially unchanged for at least the next 40 hours. During this same period the density of sample C passes through a maximum of about 0.019 g./cc., but returns to a stable density of about 0.013 g./cc. within 40 hours.

*Example III*

When a fast permeating activating liquid is employed, initial outward diffusion of vapor is very rapid and appreciable degrees of collapse are achieved before reinflation with air occurs.

Polypropylene (containing 1% silica aerogel) and methylene chloride are supplied at a 50/50 weight ratio to a 2″ screw extruder where they are blended and heated to form a solution at 150° C. This solution is supplied under 1200 p.s.i. pressure to an orifice 30 mils diameter by 180 mils long and extruded into a region at atmospheric pressure and ambient temperature. Flash evaporation of the solvent generates a cellular filament having polyhedral cells and uniplanar orientation. Rapid outward diffusion of the methylene chloride vapor leaves the filaments partially collapsed at a density of 0.042 g./cc. The collapse occurs within a few seconds of extrusion, and leaves the product with wrinkled and buckled cell walls.

In a companion experiment, symmetrical dichlorotetrafluoroethane inflatant is added to the methylene chloride at a 20/100 weight ratio and the solution temperature adjusted to 140° C. The orifice and extrusion pressure remain unchanged. The ultramicrocellular filament generated by the initial flashing of the liquid into vapor again rapidly collapses as the methylene chloride vapor diffuses out. However, appreciable quantities of the dichlorotetrafluoroethane inflatant remain in the cells and hence facilitate osmotic diffusion of air into the cells, i.e. the sample self-reinflates spontaneously in air at room temperature. By the time the first density determination is performed (15 minutes after extrusion) the product has already re-expanded to a density 0.022 g./cc.; and 20 hours after extrusion the fully expanded density of 0.010±.001 g./cc. has been reached, and remains constant for at least the next 200 hours.

At any time prior to 15 minutes after extrusion, the transient partially collapsed dichlorotetrafluoroethane-containing sample may be "trapped" by mechanically confining the sample or by removing it from contact with the air, e.g., by placing it in an air impermeable container, or in an air-free impermeant inflatant atmosphere. At this point the sample has a $N_c \cdot s^{3/2}$ value in excess of 30 and contains sufficient dichlorotetrafluoroethane in its cells so that self-reinflation will occur on subsequent unrestricted exposure to air.

*Example IV*

A pressure vessel is charged with 1,000 grams polypropylene of melt flow rate 4 at 230° C., 750 ml. of methylene chloride and 5 grams silica aerogel. Chlorotrifluoromethane is equilibrated with the mixture at a pressure of 40 p.s.i.g. The pressure vessel is sealed, heated to 150° C., and rotated end-over-end to mix the contents. At this temperature the contents form a solution with a vapor pressure of 300 p.s.i.g. The pressure vessel is positioned vertically and connected to a source of nitrogen gas at 350 p.s.i.g. just prior to extrusion of the contents through a 20 mil diameter orifice. Flash evaporation of the superheated liquid solvent generates a low density cellular strand having closed polyhedral cells with walls less than 2 microns thick exhibiting uniform texture and uniplanar orientation of the polymer. A portion of the product is collected in a plastic bag containing a chlorotrifluoromethane atmosphere (portion A), and another portion (B) is collected in air. Both initially fully expanded portions collapse within a few seconds as methylene chloride vapor rapidly diffuses out of the cells. Subsequently, portion B self-reinflates as air permeates into the cells. Portion A on the other hand remains collapsed. Two weeks later, the still collapsed portion A is exposed to air, and within 24 hours self-reinflates by a 3.8 fold volume expansion. The value of $N_c \cdot s^{3/2}$ for collapsed portion A during its storage period in the bag is about 55. The self-inflation of both portions A and B occurs as air, driven by the osmotic pressure gradient existing across the cell walls permeates into the cells faster than the slower diffusing chlorotrifluoromethane inflatant permeates out.

*Example V*

A rapid permeating activating liquid is prepared from a 25/75 volume mixture of hexane/pentane. To 90 parts (by volume) of this activating liquid is added 10 parts of a mixture of isomers of perfluorodimethylcyclobutanes, used as an impermeant inflatant. A 40 weight percent solution of polypropylene (melt flow rate 0.4 at 230° C., containing 1% by weight of silica aerogel) is prepared in the activating liquid/inflatant mixture in a pressure vessel at 141° C., and extruded at 500 p.s.i.g. through a 50 mil diameter by 50 mil long cylindrical orifice into a region at atmospheric pressure and room temperature. Flash evaporation of activating liquid generates an inflated ultra-microcellular filament structure which rapidly collapses as the activating liquid condenses and/or diffuses out of the cells. The residual impermeant inflatant content in the cells creates an osmotic driving force for post-inflation by air. Three minutes after extrusion, the first density determination indicates the sample has already inflated to a density of 0.029 g./cc. After 6 hours standing in air, the sample has inflated to a density of 0.016 g./cc., at 22 hours the density is 0.012 g./cc., and after 118 hours, the sample is fully inflated (turgid) and has reached a stable density of 0.010 g./cc, and a diameter or about 10 millimeters.

For comparison, a similar experiment is performed omitting the impermeant inflatant. Thus, a 50% solution of polymer is prepared at 142° C. in a 25/75 (volume) mixture of hexane/pentane and extruded to yield a collapsed cellular filament at a density of 0.04 g./cc. having no tendency to reinflate in air.

*Example VI*

A polypropylene ultramicrocellular sheet is extruded at a temperature of 145° C. through a 3" annular die with a 10 mil gap from a pressure vessel containing 45% solution of polymer in a mixed solvent consisting of 90 parts methylene chloride activating liquid and 10 parts symmetrical dichlorotetrafluoroethane inflatant. The sheet is wound up in a solvent vapor atmosphere at a temperature of 40° C. The roll of inflated sheet is doffed, removed from the spinning cell and rewound in air at an ambient temperature of about 25° C. Diffusion of methylene chloride from the cells (as well as condensation of residual vapor) is very rapid and leads to partial collapse of the cells, which however, retain a substantial portion of the slower diffusing dichlorotetrafluoroethane. Before reinflation due to diffusion of air into the cells can occur, the re-wound package is sealed into a polyethylene terephthalate film bag containing an atmosphere of dichlorotetrafluoroethane. Whenever reinflation is desired, the bag is opened, the roll unwound, and the product exposed to air.

*Example VII*

An inflatant/activating liquid mixture is prepared by bubbling gaseous $SF_6$ (sublimes at −64° C.) through fluorotrichloromehane which is cooled by a Dry Ice/acetone bath. The resultant slurry is mixed with polypropylene (melt flow rate 0.4 at 230° C., containing 2% by weight of silica aerogel) to give a 40% solution of the polymer. The mixture is heated in a pressure vessel to a temperature of 142° C., and extruded at 500 p.s.i.g. through a 50 ml. diameter by 50 ml. long cylindrical orifice into a region at atmospheric pressure and room temperature. The inflated ultramicrocellular filament initially formed partially collapses within a few moments, the density of the filament one-half hour after extrusion being 0.021 g./cc. Upon continued exposure to air at room temperature for 3 days, the sample inflates to a density of 0.015 g./cc.

*Example VIII*

This example illustrates the utilization of a polymer having a Tg in excess of 40° C. and the production of a collapsed ultramicrocellular structure which does not self-inflate in air until heated.

A mixture of 400 grams polyethylene terephthalate Tg>69° C., sample dried at 110° C. in a vacuum oven), 325 grams methylene chloride (activating liquid) and 70 grams 1,1,2-trichloro-1,2,2-trifluoroethane (impermeant inflatant) is heated in a 1 liter pressure vessel to a temperature of 220° C. and a uniform solution is formed by rotating the pressure vessel end-over-end. The autogenous pressure of 720 p.s.i.g. is increased with nitrogen gas to 800 p.s.i.g. just prior to extrusion through an orifice 0.005 inch diameter by 0.025 inch long into a region at atmospheric pressure. Flash evaporation of the activating liquid gives an ultramicrocellular filament. The filament, generated at the rate of 1900 y.p.m., is led to a windup operated at 2020 y.p.m., and wound on a bobbin under slight tension. Most of the methylene chloride vapor permeates out of the filament between the extrusion orifice and the windup, and the remainder condenses at room temperature, so that a substantially collapsed closed cell filament is woundup directly. The tension of the yarn on the package prevents air from permeating the trifluorotrichloroethane-containing cells and reinflating the structure. The sample is allowed to stabilize during two days storage at room temperature The collapsed yarn is now metastable and may be removed from the bobbin (i.e., tension removed) without reinflation occurring. The density of the yarn removed from the outside of the package is 0.12 g./cc., while the still more tightly confined yarn on the inside of the package has an even high density of 0.23 g./cc. Both of these metastable samples reinflate to a density of 0.046 g./cc. on being heated in a 100° C. air oven. A portion of the collapsed yarn removed from the bobbin and stored under no mechanical restraint at room temperature for one week retains its density of 0.23 g./cc. but inflates to a density of 0.046 g./cc., as before, on being heated only 5 minutes at 100°

C. The residual trifluorotrichloroethane content of the inflated cellular material is 4 ml./g. of product (i.e. an internal partial pressure of approximately 145 mm.). The polymer in the cell walls exhibits uniform texture and uniplanar orientation.

The thickness of the cell walls of this sample is 0.22 micron, and the average cell diameter of the inflated sample is 20 microns. From this latter number, $N_i$ (the number of cells per cc. of the inflated sample) is estimated to be $1.3 \times 10^8$ cell/cc., and the average cell surface area is therefore calculated to be $$\left(\frac{0.046}{1.38}\right) \times \frac{2}{2 \times 10^{-5} \times 1.3 \times 10^8} = 2.3 \times 10^{-5} \text{ cm.}^2 \text{ per cell}$$

$N_c$ is estimated from $$N_c = 1.3 \times 10^8 \times \frac{0.23}{0.046} = 6.5 \times 10^8 \text{ cell/cc.}$$

Therefore, $N_c \cdot s^{3/2} = 73$ for this sample.

*Example IX*

Polypropylene ultramicrocellular filaments spun from solutions without impermeant inflatants are obtained in substantially collapsed form. Thus, 50% solutions (containing 1% silica aerogel based on the polymer weight) in hexane at 136° C. and in 2,2-dimethylbutane at 145° C. are extruded through a 50 mil spinneret to yield partially collapsed ultramicrocellular filaments of density 0.081 and 0.042 g./cc. respectively These samples are subsequently placed in a 3 liter pressure vessel charged with 300 ml. of methylene chloride and 300 ml of perfluorocyclobutane, the vessel sealed and heated to a temperature (approximately 55–60° C.) which yields an internal pressure of approximately 120 p.s.i.g This treatment gives rise to a temporary plasticizing effect upon the cell walls such that perfluorocyclobutane is caused to penetrate the closed partially collapsed cells of the samples. When the pressure vessel is subsequently cooled and the sample removed, the methylene chloride rapidly diffuses away, leaving the perfluorocyclobutane "locked" in the cells. Thus, an osmotic pressure gradient exists which drives air into the samples to full reinflate both of them to a density of 0.007 g./cc. The inflatant half-life for such samples e.g., the time required for half of the original perfluorocyclobutane to diffuse out and be lost to the atmosphere is on the order of 40 days or more.

*Example X*

A plastic bag containing fully inflated polypropylene ultramicrocellular fibers of density 0.017 g./cc. is hung in a chamber. Symmetrical dichlorotetrafluoroethane is introduced and refluxed in the chamber. As the air in the chamber is displaced by the dichlorotetrafluoroethane vapor, the fibers collapse by loss of air, since air permeates out of the cells faster than dichlorotetrafluoroethane permeates in. With 1½ hours the density of the fibers has increased to 0.037 g./cc. The excess vapor in the bag is mechanically expelled, and the bag sealed to prevent air from contacting and reinflating the collapsed fibers when the bag is removed from the chamber. At this point the bag occupies a relatively small volume. When the fibers, which now have a quantity of dichlorotetrafluoroethane in their collapsed cells, are subsequently re-exposed to air, they begin to self-reinflate and after standing only overnight, have already expanded to a density of 0.023 g./cc. This technique may be used to provide expanded-in-place insulation for refrigerators and the like, as well as effect savings in shipping and storage.

*Example XI*

Polyethylene terephthalate ultramicrocellular filaments are prepared in a continuous process by feeding polymer chips of RV50 (dried 36 hours at 165° C.) to an extruder at a rate of 196 parts/minute. The chips are advanced and compressed by a rotating screw, heated to melt the polymer which is then mixed with methylene chloride supplied from an auxiliary pump at 105 parts/minute to form a solution at 212° C. which is extruded under a pressure of 800 p.s.i.g. through a cylindrical orifice 12 mils in diameter by 6 mils long.

These polyethylene terephthalate filaments, like the polypropylene filaments of Example IX, contain no spun-in impermeant inflatant. Accordingly, skeins of the filaments are immersed for 20 minutes in a solution of chloropentafluoroethane in methylene chloride refluxing at 5° C. under 1 atmosphere pressure. The skeins are then transferred directly to a 70° C. water bath for 60 seconds to strip off the methylene chloride plasticizer (trapping the chloropentafluoroethane impermeant inflatant inside the cells) and then heated in air at 125° C. for 30 minutes to accelerate full reinflation by air diffusing osmotically in the cells. In an analogous procedure perfluorocyclobutane (another impermeant inflatant) is introduced into several skeins of the as-spun filaments by employing a perfluorocyclobutane/methylene chloride bath refluxing at −6° C. and a 30 minute immersion time. In each case the fully inflated filaments contain approximately .3 atmosphere partial pressure of the impermeant inflatants inside the cells plus approximately 1 atmosphere partial pressure of air.

These polyethylene terephthalate ultramicrocellular filaments possess excellent cushioning properties which are extraordinary durable. Recovery from momentary (cyclical) loads is excellent. Furthermore, if a dead load is applied long enough for some of the air to have diffused out of the cells, on removal of the load the sample will tend to self-reinflate to its original condition as external air is osmotically reintroduced into the cells—so long as the impermeant inflatant has been retained within the cells. A particularly rigorous arbitrary test has been developed to evaluate quantitatively this cushioning performance feature. A parallel array of contiguous inflated filaments is subjected to a dead load of 200 p.s.i. applied to the face of the array for a period of one week. The initial compression is followed by a further slow compression as air diffuses out of the cells. After one week the load is removed, and the initial rapid recovery is followed by a slow additional recovery for one week as air re-enters the cells. The percent recovery of the initial thickness of the array is measured, as well as the percent loss of the initial impermeant inflatant content. Table I records the test results for polyethylene terephthalate ultramicrocellular filaments containing a variety of impermeant inflatants.

TABLE I

| INFLATANT | 200 P.s.i. Test | |
| --- | --- | --- |
| | Percent Recovery | Percent Lost |
| $C_4F_8$(cyclic) | 81 | 4 |
| $CClF_2$-$CF_3$ | 81 | 3 |
| $CF_2Cl_2$ | 51 | 59 |
| $CBrF_2$-$CBrF_2$ | 7 | 69 |
| $CBrF_3$ | 61 | 28 |
| $CClF_2$-$CClF_2$ | 50 | 83 |
| $CHClF_2$ | 7 | 100 |
| $CCl_3F$ | 10 | 77 |

Perfluorocyclobutane and chloropentafluoroethane are clearly preferred as having a good (high) recovery and desirable (low) loss of inflatant from the sample. It is, of course, true that for those cushioning or other applications where such extreme loads are not encountered, many of the other impermeant inflatants in the table will perform very well, and may in fact be preferred for other reasons.

I claim:

1. An ultramicrocellular structure composed of a high molecular weight synthetic crystalline polymer and having a major proportion of closed polyhedral cells defined by air permeable walls having a thickness of less than 2 microns with essentially all the polymer constituting cell walls and exhibiting uniform texture and uniplanar orientation, said cells containing an inflatant whose permeability coefficient for diffusion through said walls is less than that of air, said inflatant being capable of generating a vapor pressure of at least 30 mm. Hg. at a temperature below the softening point of the polymer and being selected from the group consisting of sulfur hexafluoride and saturated aliphatic and cycloaliphatic compounds having at least one fluorine to carbon covalent bond and wherein the number of fluorine atoms exceeds the number of carbon atoms.

2. The ultramicrocellular structure of claim 1 wherein said saturated aliphatic and cycloaliphatic compounds are, respectively, perhaloalkanes and perhalocycloalkanes in which at least 50% of the halogens are fluorine.

3. The ultramicrocellular structure of claim 1 wherein said inflatant is an impermeant inflatant.

4. The ultramicrocellular structure of claim 1 wherein said inflatant is perfluorocyclobutane.

5. The ultramicrocellular structure of claim 1 wherein said inflatant is perfluorodimethylcyclobutane.

6. The ultramicrocellular structure of claim 1 wherein said inflatant is sulfur hexafluoride.

7. The ultramicrocellular structure of claim 1 wherein said synthetic crystalline polymer is polypropylene.

8. The ultramicrocellular structure of claim 1 having at least $10^3$ cells/cc.

9. The ultramicrocellular structure of claim 8 in the form of filamentary material.

10. The ultramicrocellular structure of claim 8 in the form of sheet material.

11. The ultramicrocellular structure of claim 8 wherein said synthetic crystalline polymer is polyethylene terephthalate.

12. The ultramicrocellular structure of claim 11 wherein said inflatant is perfluorocyclobutane.

13. The ultramicrocellular structure of claim 11 wherein said inflatant is chloropentafluoroethane.

14. A self-inflatable ultramicrocellular structure composed of a high molecular weight synthetic crystalline polymer and having a major proportion of closed, at least partially collapsed but unruptured polyhedral cells defined by air permeable walls having a thickness of less than 2 microns with essentially all the polymer constituting cell walls and exhibiting uniform texture and uniplanar orientation, said cellular structure being further characterized as being post-inflatable to less than one-half its collapsed density without substantial stretching of the cell walls by having an $N_c \cdot s^{3/2}$ product greater than about 30, wherein $N_c$ is the number of cells per cc. in the collapsed structure and $s$ is the average cell surface area in square centimeters, said cells containing an inflatant whose permeability coefficient for diffusion through said walls is less than that of air, said inflatant being capable of generating a vapor pressure of at least 30 mm. Hg. at a temperature below the softening point of said polymer and being selected from the group consisting of sulfur hexafluoride and saturated aliphatic and cycloaliphatic compounds having at least one fluorine to carbon covalent bond and wherein the number of fluorine atoms exceeds the number of carbon atoms.

15. The self-inflatable ultramicrocellular structure of claim 14 wherein said synthetic crystalline polymer is polyethylene terephthalate.

16. The self-inflatable ultramicrocellular structure of claim 15 wherein said inflatant is perfluorocyclobutane.

17. The self-inflatable ultarmicrocellular structure of claim 15 wherein said inflatant is chloropentafluoroethane.

18. A storage stable article comprising (a) the ultramicrocellular structure of claim 14 and (b) gas impervious barrier means surrounding said structure acting to substantially prevent an increase in the volume of gas in the said cells.

19. The article of claim 18 wherein said gas impervious barrier means comprises a sealed container having disposed therein an impermeant gas which envelops said ultramicrocellular structure.

20. The articles of claim 19 wherein said sealed container is a plastic bag.

21. The article of claim 19 wherein said impermeant gas is the same as said inflatant.

References Cited
UNITED STATES PATENTS

| | | | |
|---|---|---|---|
| 2,746,088 | 5/1956 | Lindemann et al. | 260—2.5 |
| 2,884,386 | 4/1959 | McMillan et al. | 260—2.5 |
| 3,227,664 | 1/1966 | Blades et al. | 260—2.5 E |
| 3,227,784 | 1/1966 | Blades et al. | 260—2.5 E |

MURRAY TILLMAN, *Primary Examiner.*

M. FOELAK, *Assistant Examiner.*